United States Patent [19]

Rice

[11] Patent Number: 4,764,495

[45] Date of Patent: Aug. 16, 1988

[54] PROCESS FOR SURFACE TREATING LAYERED LATTICE SILICATES AND RESULTANT PRODUCTS

[75] Inventor: Camilla A. Rice, Sandersville, Ga.

[73] Assignee: E.C.C. America Inc., Atlanta, Ga.

[21] Appl. No.: 930,278

[22] Filed: Nov. 12, 1986

Related U.S. Application Data

[63] Continuation-in-part of Ser. No. 699,120, Feb. 8, 1985, abandoned.

[51] Int. Cl.$^4$ .............................................. B01J 29/06
[52] U.S. Cl. ........................................ 502/62; 502/80; 502/85; 423/112; 423/118; 423/328; 260/448 C; 106/487; 556/9; 556/12
[58] Field of Search .............................. 502/62, 80, 85; 423/118, 328, 112; 106/288 B, 288 Q, 308 B, 308 Q; 260/448 C

[56] References Cited

U.S. PATENT DOCUMENTS

| | | | |
|---|---|---|---|
| 1,215,396 | 2/1917 | Millosch et al. | 423/328 |
| 1,915,894 | 12/1929 | Kruger | 423/118 |
| 3,201,197 | 8/1965 | Showalter | 423/112 |
| 3,227,675 | 1/1966 | Papalos | 524/142 |
| 3,290,165 | 12/1966 | Iannicelli | 106/308 N |
| 3,567,680 | 3/1971 | Iannicelli | 524/262 |
| 4,497,903 | 2/1985 | Kibby et al. | 502/85 |
| 4,539,304 | 9/1985 | Field | 502/85 |
| 4,539,305 | 9/1985 | Wilson et al. | 502/85 |

OTHER PUBLICATIONS

W. F. Spencer and J. E. Gieseking, "Organic Derivatives of Montmorillonite" Jl. Physical Chemistry; 56, 751–753 (Jun. 1952).

G. Brown, R. Greene-Kelly and K. Norrish, "Organic Derivatives of Montmorillonite" Nature, London, 169, 756 (1952).

*Primary Examiner*—Robert L. Stoll
*Attorney, Agent, or Firm*—Stefan J. Klauber

[57] ABSTRACT

A surface treated clay such as kaolin is prepared by a process in which the clay surface is preconditioned by treatment with gaseous hydrogen and then functionalized by reaction with a polymerizable organic moiety of an organic compound. The products are useful as fillers for rubber, resin, plastic, paper and the like.

10 Claims, No Drawings

PROCESS FOR SURFACE TREATING LAYERED LATTICE SILICATES AND RESULTANT PRODUCTS

RELATED APPLICATION

This application is a continuation-in-part of co-pending application Ser. No. 699,120, filed Feb. 8, 1985, now abandoned.

BACKGROUND OF INVENTION

This invention relates generally to siliceous minerals such as aluminosilicates and the like, and in particular relates to a method in which said mineral is pretreated to enhance subsequent functionalization, then is caused to react with a functional group-containing variety of an organic compound.

The invention relates specifically to layered silicates of the type which can be represented by the general formula $E_iM_xSi_yO_n(OH)_m$ where M is Al, Mg, or Fe, $x=2$ to 6; $y=2$ to 8, $n=2$ to 20, $m=0$ to 8, and $E_i$ is one or more exchangeable ions (K, Na, Mg, Ca, Ba, Fe, Li, etc.). These layered silicates will hereinafter in this specification be referred to as "layered lattice silicates".

In this disclosure, the term "functionalization" means using a reactant that contains a functional group. The functional group subsists at least to some extent in the product obtained except when an olefin is used which leaves an alkane as product. The term "surface treated" means that only the surface is modified, that is, there is no intercalation in the layered lattice silicate or breakdown of its structure.

In the instance of layered lattice silicates such as kaolin clays, it has long been recognized that products having new properties and uses could be formulated by combining these aluminosilicates with organic materials. However, useful progress in this direction has tended to be limited by the lack of available covalent bonding at the mineral/organic interface. In the past this difficulty has been partially overcome by surface modification of the kaolinite through coupling of organosilane compounds, and subsequent reaction between dependant silanes and organics.

Thus, in Papalos U.S. Pat. No. 3,227,675, for example, kaolin clays are described, the surfaces of which are modified with organofunctional silanes. A typical such agent, e.g., is a methacryloxypropyltrimethoxy silane. The kaolin clays so modified are advantageously used as fillers for natural and synthetic rubbers and the like. It is also pointed out in this patent that such modified products can serve as intermediates for synthesis of new pigments, which are useful as fillers for polymers, elastomers and resins. This result obtains because the silanes used to modify the kaolin clays are di- or polyfunctional, and only one functional group, the silane, is attached to the clay, leaving the remaining reactive groups to react further.

Additional references of this type include Iannicelli U.S. Pat. No. 3,290,165, and Iannicelli U.S. Pat. No. 3,567,680.

However, the modification of aluminosilicates such as kaolin clays by the use of organosilanes, is a complicated and expensive process. Among other things, the cost of the organosilane itself is very high. Furthermore, the resulting products have only limited capability for further reaction, regardless of the particular organosilanes utilized.

It has heretofore been known in addition, that in certain instances high temperature reactions of silicate films with hydrogen can be utilized for certain purposes, such as the production of hydroxide free silica for optical glasses. It is also known to those skilled in the art that products known as "hydrogen clays" can be produced by aqueous reaction of clays with mineral acids, as for example is described in U.S. Pat. No. 3,201,197. Such reactions have substantially no bearing upon the present invention, as will henceforth become evident.

In accordance with the foregoing, it may be regarded as as an object of the present invention, to provide a relatively simple and effective process for forming active intermediates from layered lattice silicates, such as aluminosilicates, which intermediates are eminently capable of subsequent functionalization with organic groups.

The kaolin group of clays represents a crystal structure wherein one gibbsite sheet is condensed with one silica sheet, forming a stable non-expanding type crystal lattice, whereas the remaining two groups, the montmorillonite group and illite group, conform to the expanding crystal lattice, consisting of a gibbsite sheet enclosed between two silica sheets. Clays composed of the non-expanding lattice structures are said to possess moderate surface activity and generally form relatively free flowing systems in water; whereas those composed of the expanding crystal lattice are capable of high colloidal activity and hydration, producing plastic and gel-like water systems.

It is therefore a specific object of the invention to combine kaolin clays with organic materials thereby rendering them lipophilic. That is to say, it is desirable to render normally hydrophilic layered lattice silicates such as kaolin, oleophilic, whereby they may be used as fillers for organic materials such as polymers, elastomers, resins and the like.

It is a yet further object of the present invention, to provide a novel process for preparing analogs of known silane-modified layered lattice silicates, such as analogs of known silane-modified kaolin clays, which process produces such materials with much greater simplicity than prior known techniques for producing the said silane-modified clays.

SUMMARY OF INVENTION

Now in accordance with the present invention, the foregoing objects, and others which will become apparent in the course of the ensuing specification, are achieved by a method comprising pretreating layered lattice silicates in substantially dry particulate form, with a hydrogen-containing gas thereby activating the surface thereof. By "activating the surface" is meant that the surface becomes susceptible to the surface bonding or reaction or polymerization of organic moieties. The pretreatment conditions the silicate in some manner so as to make it more receptive to reaction with the functional group-containing organic compound. At all events it has now been found that the final product according to the invention shows chemical bonding at the silicate surface.

The said pretreatment may be conducted at temperatures above about 250° C. Typical temperatures utilized are in the range of from about 300° C. to about 400° C.

The composition may be treated with gaseous hydrogen. This mixture may include as well an inert gas carrier, such as nitrogen or argon.

The gaseous treating composition may further, and preferably does, comprise a mixture of hydrogen and nitrogen. The hydrogen may comprise from about 5% to 100% by volume of the total gas, with a preferred range being from 5% to 50% by volume.

The contacting may be conducted in a fluidized bed reactor, with the gaseous components passing upwardly through a suitable diffuser plate, and into a fluidized bed of the particulate material being treated. The contacting may also be conducted in similar apparatus which provides good gas-solids contact. Typical treatment times are from about 5 to 30 minutes, depending upon concentration of the ingredients and temperature, although longer times can be utilized.

Various layered lattice silicates, including minerals comprising the same, may be treated by the method of the invention. Thus, for example, clays of the halloysite, illite, kaolinite, montmorillonite, palygorskite groups, and various other clays, can be readily treated by the present invention.

The intermediates prepared by use of the present process are highly reactive, and may lose their activity if substantial moisture or atmospheric oxygen are present. For this reason, once the said intermediates are prepared, and until they are used, they must be maintained in a substantially dry state.

The functionalization of the hydrogen treated silicate materials can be achieved by various methods, such as by contacting them under suitable reaction conditions with compounds having active organic groups, for example, C=C. The reaction is suitably carried out with the functionalizing reactant in the fluid phase, i.e., in the liquid or preferably the gaseous phase. This can be effected by various techniques, for example, in many instances by simple mixing of the intermediate with the reactant.

In general, since the pretreatment/reaction only involve the surface, times for these interactions are relatively short.

In general, the useful organic compounds contain polymerizable organic moieties and include olefins, diolefins, acetylenes, allylic compounds and vinyl compounds. These unsaturated compounds may, for example, be hydrocarbon substituted or unsubstituted ethylene such as ethylene, propylene; hydrocarbon substituted or unsubstituted butadiene such as butadiene, isoprene; vinyl pyridines, vinyl acetate, styrene, acrylic acid, phenyl acetylene, allyl mercaptans and allyl amines. Temperature conditions are generally moderate, suitably above room temperature and up to about 300° C. Reaction times are short since one is only satisfying the surface demand, and a time in the range of about 15 seconds to about 5 minutes will generally be sufficient although it may be extended if desired up to about 1 hour.

DETAILED DESCRIPTION

The invention will now be illustrated by a series of Examples, which, however, are to be considered as merely exemplary of practice of the invention, and not as delimitive thereof.

EXAMPLE I

Preparation of a Surface Modified Kaolin Clay

In this Example, the starting material was an air-floated kaolin clay, having approximately 60% by weight of the particles thereof less than 2 microns equivalent spherical diameter (E.S.D.). A 400 gram sample of this material was initially dried for 1½ hours in an oven at temperatures of about 150° C. The sample showed a weight loss, indicating that moisture had been successfully driven off from same, to produce a substantially dry material.

The said sample was placed in a laboratory fluidized bed reactor, the system was equilibrated to 300° C., at which time a mixture of hydrogen and nitrogen in a volume ratio of 5 to 95 parts, at 300° C., was passed through the fluidized bed. The gas mixture was flowed at the rate of about 0.7 standard cubic feet per minute (SCFM), and served to sustain the fluidized bed. The hydrogen treated clay was cooled to 80° C. in a stream of nitrogen gas. 1,3 butadiene (at room temperature) was passed through the intermediate activated clay for one minute. The resultant surface modified clay was found to be partially hydrophobic in a water system, in contrast to the properties of an untreated kaolin clay. An elemental analysis showed an increase of 0.32% carbon. The clay was found to decolorize both a solution of potassium permanganate, and a bromine in carbon tetrachloride solution, indicating the presence of unsaturation on the clay. The carbon was not removed by either water or acetone washing. A differential scanning calorimetry measurement of the treated clay showed that the organic was thermally stable on the clay surface to at least 300° C.

EXAMPLE II

In this Example, a further sample of an air-floated relatively fine fraction of kaolin clay having a P.S.D. (particle size distribution) such that 60% by weight of the particles thereof were less than 2 microns E.S.D., was subjected to hydrogen treatment in accordance with the present invention. The sample was treated with a combination of nitrogen and hydrogen under conditions generally identical to those of Example I. The sample in particular, after being initially dried, was treated in the laboratory fluidized bed reactor for a time of 15 minutes at a temperature of 280° C.

A portion of the resultant intermediate from this Example was maintained under argon and approximately 3 grams were transferred to a thick walled glass ampul (still under argon), with approximately 2% by weight of allylchoride being added as a liquid at room temperature. The ampul was sealed and then placed in a 50° C. oven for 30 minutes. The resultant functionalized product was found to contain 0.15% allylchloride (based on both carbon and chlorine analysis.) The resulting product did not decolorize potassium permanganate solution or a bromine in CCl$_4$ solution, indicating the disappearance of the unsaturated character of the allylchloride. Infrared spectra were obtained on the treated and untreated clay samples. There was a definite appearance of a CH stretch in the 3050 to 2750 cm$^{-1}$ range for the treated clay sample. This organic was not removed from the surface by acetone or water washing.

EXAMPLE III

In this instance, a 400 gram sample of an air classified kaolin was initially dried as with the procedure of Example I, and loaded into a laboratory fluidized bed reactor, and the temperature equilibrated at 250° C. A fluidized bed was established by flow of nitrogen from a source having a regulated pressure of approximately 10 pounds per square inch. 50% of hydrogen at 300° C. was flowed into the reactor with the nitrogen inert gas, and the treatment was carried out initially for 15 minutes at 300° C. At the conclusion of the treatment, the intermediate product was cooled to 80° C. and allylmercaptan was vaporized in N₂ and flowed through the hydrogen activated clay for approximately 4 minutes (approximately 20 ml in total of allylmercaptan). There was a color change of the clay associated with the allylmercaptan treatment. Based on an elemental analysis of total carbon, there was a 0.14% carbon increase upon reaction, translating to approximately 0.29% allylmercaptan bonded to the surface.

EXAMPLE IV

In this instance, a 400 gram sample of an air classified kaolin was initially dried as with the procedure of Example I, and loaded into a laboratory fluidized bed reactor, and the temperature equilibrated at 300° C. A fluidized bed was established by flow of nitrogen from a source having a regulated pressure of approximately 10 pounds per square inch. 50% of hydrogen at 300° C. was flowed into the reactor with the nitrogen inert gas, and the reaction was carried out initially for 15 minutes at 300° C. At the conclusion of the treatment, the sample was cooled to 70° C. and treated with propylene gas for 1 minute which was just passed through a heat exchanger at 300° C. The resultant clay showed a total carbon content increase of 0.14%.

The products of the present invention are found to be particularly useful as fillers in polymers, elastomers, plastics, paints or papers. Where such materials, for example, are used as fillers in epoxy compounds, it is found that the resultant cured epoxy systems display increased hardness and higher shear adhesion strength than have been obtainable with prior art fillers based upon kaolin clays, or silane-modified kaolin clays.

The following Example V is representative of the improvements achieved in filled resin systems in accordance with the present invention.

EXAMPLE V

In this Example, three different surface modified kaolins were prepared by procedures similar to Example I, but with differing surface treatment levels as indicated below:

TABLE I

| Sample | Treatment | % Carbon* |
|---|---|---|
| A | H₂ + 1, 3 butadiene (30 sec.) | 0.14 |
| B | H₂ + 1, 3 butadiene (2 min.) | 0.98 |
| C | H₂ + 1, 3 butadiene (1 min.) | 0.32 |

*increase in total carbon content after reaction with 1, 3 butadiene

The above products were then used as fillers in an otherwise conventional EPDM (ethylene propylene diene monomer) insulation formulation. An untreated filler was also used as a control, specifically the untreated clay used in Example I. The insulation formulation was as follows:

TABLE II

| EPDM Insulation Formulation | |
|---|---|
| Additive | parts per 100 parts EPDM rubber |
| Vistanlon* 4608 (EPDM) | 100 |
| Zinc Oxide | 5 |
| Stearic Acid | 0.5 |
| Flectal H** | 1.5 |
| Percardox⁺ 14/40 (peroxide) | 7.0 |
| Rhenufit⁺⁺ Tac/s (coagent) | 2.0 |
| Filler (A, B, C or control) | 150 |

TABLE II-continued

| EPDM Insulation Formulation | |
|---|---|
| Additive | parts per 100 parts EPDM rubber |
| Sunpar⁺⁺⁺ 2280 (oil) | 30 |

*Esso Chemical
**Monsanto (anti-oxidant)
⁺Akzo (curing agent)
⁺⁺Bayer (initiating catalyst)
⁺⁺⁺Sun Oil Co. (lubricant)

The above formulations were cured at 170° C. for 20 minutes and the physical properties of the resultant samples were determined as follows:

TABLE III

PHYSICAL PROPERTIES OF EPDM FILLED WITH VARIOUS KAOLIN SAMPLES

| Filler | % Elongation at Break | Tensile* (MPa) | Modulus** 100% (MPa) | Tear*** Newtons per mm | Shore A Hardness |
|---|---|---|---|---|---|
| A | 440 | 6.6 | 3.5 | 54 | 68 |
| B | 800 | 8.0 | 2.4 | 68 | 67 |
| C | 800 | 6.5 | 2.4 | 51 | 67 |
| Untreated kaolin (control) | 340 | 4.2 | 2.5 | 55 | 67 |

*Tensile is the force per unit area required to stretch the test piece to its breaking point.
**Modulus at 100% is the stress required to stretch a test piece of rubber to 100% elongation and is repeated in units of mega Pascals.
***Tear strength is the force required to tear a unit thickness of a test piece.

As seen in Table III, the EPDM samples filled with the products of the invention show very marked improvements in elongation and tensile, as compared with the samples filled with the prior art untreated kaolins.

EXAMPLE VI

In this Example a further surface modified kaolin was prepared as in Example IV and was then used as a filler at the 30% weight level in a polypropylene system. Physical properties were evaluated for the resultant filled system and compared with such properties for an unfilled polypropylene and for a polypropylene filled (at 30%) with an untreated kaolin clay. Results are set forth in Table IV below:

TABLE IV

PHYSICAL PROPERTIES OF FILLED POLYPROPYLENE

| | Tensile Modulus (MPa) | Tensile Strength (MPa) | % Elongation at Break |
|---|---|---|---|
| Polypropylene (PROFAX) filled with untreated kaolin control | 1440 | 25.3 | 8 |
| Unfilled polypropylene control | 1220 | 31.8 | 15 |
| Polypropylene (PROFAX) filled with treated kaolin | 1775 | 33 | 6 |

It will be seen from Table IV that the polypropylene system filled with the treated clay displayed an increase in tensile modulus and tensile strength over either of the control formulations.

EXAMPLE VII

An air-classified kaolin (80% less than 2 micrometers, E.S.D.; surface area = 19 m²/g) was treated in a fluidized bed reactor at 180° C. for 30 minutes in a 50%/50% by volume hydrogen/nitrogen atmosphere. It was cooled to room temperature in a 100% $N_2$ atmosphere. A sample was transferred to a glass ampul and 2 weight % 2-vinylpyridine (a liquid) based on the weight of the clay was introduced into the ampul atmosphere. The ampul was flushed with nitrogen to remove any traces of oxygen and sealed. It was placed in an oven at 170° C. and reacted for 30 minutes. At the end of the 30 minutes reaction time, the ampul was removed from the oven and cooled to room temperature. The ampul was opened, the clay removed and split into 2 samples. One sample was water washed. The other was acetone/ether washed. The resulting washed products contained 0.82% 2-vinylpyridine as determined by carbon and nitrogen analysis.

EXAMPLE VIII

An air-classified kaolin clay as described in Example VII was treated in a fluidized bed reactor in 50%/50% by volume $N_2/H_2$ atmosphere for 5 minutes at 305° C. The clay was cooled in $N_2$ to 178° C. and acetylene gas was then passed through the clay for 5 minutes. The clay was further cooled to room temperature in a $N_2$ atmosphere. The treated sample was analyzed by carbon species. The resulting clay has a carbon content 0.16% greater than before the reaction. None of the organic was removed by solvent washing.

EXAMPLE IX

The same kaolin as in Example VII was treated in a fluidized bed at 300° C. for 5 minutes in a 50%/50% by volume $N_2/H_2$ atmosphere. The kaolin was cooled to room temperature in $N_2$. 100 g of the $H_2$ treated kaolin was transferred under $N_2$ to a Waring Blendor and treated with 0.25 weight % allylamine for 5 minutes. The resulting treated kaolin were analyzed for carbon and nitrogen before and after washing with acetone. The treated kaolin had a carbon content of 0.11% carbon and 0.026% nitrogen after reaction. The N and C content did not change upon solvent washing.

EXAMPLE X

An air-classified kaolin (82% less than 2 micrometers E.S.D.; surface area=20.2 $m^2/g$) was treated in 50%/50% by volume $N_2/H_2$ atmosphere at 300° C. for five minutes. The resulting kaolin was cooled to room temperature in a nitrogen atmosphere. 100 g was transferred under nitrogen to a nitrogen filled Waring Blendor and treated with 0.5% ethylmercaptan. The system was allowed to react at room temperature for five minutes. The resulting kaolin showed an increase in carbon and sulfur content of 0.29 and 0.29% respectively. The content of carbon and sulfur was unchanged by acetone or water washing.

EXAMPLE XI

An air-classified kaolin (82% less than 2 micrometers E.S.D.; 20.2 $m^2/g$ surface area) was treated in a fluidized bed reactor in a 50%/50% $N_2/H_2$ atmosphere at 312° C. for fifty minutes. The kaolin was cooled in a stream of nitrogen to 40° C. and then reacted for 10 minutes with allyl amine which was vaporized in a stream of argon. At the end of the reaction, the sample was analyzed for carbon and nitrogen by elemental analysis, indicating 0.42% allylamine had reacted with the surface. None of the organic was removed by solvent washing.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

What is claimed is:

1. A method for surface treating a layered lattice silicate clay mineral which comprises the steps of:
   pretreating said layered lattice silicate in dry, particulate form with a hydrogen-containing gas to activate the surface thereof for reaction with functional group-containing organic compounds, maintaining the so treated silicate in a sufficiently dry state to avoid loss of activity, until further reacted; and
   reacting the so treated silicate with a functional group-containing organic compound, said group being a polymerizable organic moiety, to functionalize the same and form a surface-modified product.

2. A process in accordance with claim 1, wherein said pretreatment is conducted at temperatures above about 250° C.

3. A process in accordance with claim 2, wherein said pretreatment is conducted at temperatures from about 300° C. to about 400° C.

4. A method in accordance with claim 2, wherein said hydrogen-containing gas includes a dry inert gas carrier.

5. A method in accordance with claim 4, wherein said inert gas carrier comprises dry nitrogen or argon.

6. A method in accordance with claim 1 or 2, wherein said pretreatment is conducted in apparatus for contacting particulate solids with gases.

7. A method in accordance with claim 1, wherein said clay mineral comprises a kaolin clay.

8. A method in accordance with claim 1 in which the reaction time with said organic compound is within the range of about 15 seconds to about 1 hour.

9. A method in accordance with claim 1 in which said organic compound is an unsaturated compound selected from the group consisting of olefins, diolefins, acetylenes, allylic compounds and vinyl compounds.

10. A method in accordance with claim 1 in which said organic compound is selected from the group consisting of hydrocarbon substituted or unsubstituted ethylene, hydrocarbon substituted or unsubstituted butadiene, vinyl pyridines, vinyl acetate, styrene, acrylic acid, phenyl acetylene, allyl mercaptans and allyl amines.

* * * * *